United States Patent
Cheng

(10) Patent No.: US 7,221,402 B2
(45) Date of Patent: May 22, 2007

(54) MONITORING CAMERA

(76) Inventor: Yi-Jen Cheng, 9F, No. 21, Sec. 2, Chorngder 2 Rd., Taichung (TW)

( * ) Notice: Subject to any disclaimer, the term of this patent is extended or adjusted under 35 U.S.C. 154(b) by 763 days.

(21) Appl. No.: 10/704,747

(22) Filed: Nov. 12, 2003

(65) Prior Publication Data

US 2005/0099520 A1  May 12, 2005

(51) Int. Cl.
*H04N 5/225* (2006.01)
(52) U.S. Cl. ............... 348/375; 348/376; 396/533
(58) Field of Classification Search ........... 396/530, 396/533

See application file for complete search history.

(56) References Cited

U.S. PATENT DOCUMENTS 4,893,143 A * 1/1990 Sheng-Huei ............ 396/530
5,032,919 A * 7/1991 Randmae ............... 348/345
5,208,624 A * 5/1993 MacKay ................ 396/544
5,400,073 A * 3/1995 Morioka et al. ........ 348/335
6,683,654 B1 * 1/2004 Haijima ................ 348/374
2001/0017662 A1 * 8/2001 Nomura et al. ........ 348/358

* cited by examiner

*Primary Examiner*—Ngoc-Yen Vu
*Assistant Examiner*—Dillion Durnford-Geszvain
(74) *Attorney, Agent, or Firm*—Lowe Hauptman & Berner, LLP

(57) ABSTRACT

A monitoring camera has a body (10), a focus ring (20), a lens (30) and an optional control cover assembly (50). The focus ring (20) has an inner flange with an inner threaded surface (24) and an outer threaded surface (23) to attach respectively to the lens (30) and the body (10). The structure allows the lens (30) to be focused over a broad range. Additionally, the control cover assembly (50) is attached to a side face of the body (10) to cover and protect multiple switches (16) on the body (10).

5 Claims, 5 Drawing Sheets

MONITORING CAMERA

BACKGROUND OF THE INVENTION

1. Field of the Invention

The present invention relates to a monitoring camera, and more particularly to a monitoring camera that is mounted on a wall in a fixed place but can be easily adjusted.

2. Description of Related Art

Monitoring cameras mostly are mounted in a fixed position at a high place in buildings or street corners to provide recordings of a specific location for security purposes or to document accidents. A conventional monitoring camera has a body, a focus ring, a standard lens and an optional telephoto lens detachably mounted on the body, wherein the telephoto lens usually is classed with two international standard, one is a C-mount and the other is a CS-mount.

The focus ring is a disk with a central hole that has an inner flange. The inner flange has an inside surface, a threaded outside surface and a bayonet mount on the inside surface. The threaded outer surface is screwed onto the body.

The telephoto lens or the standard lens is attached to the bayonet mount in the focus ring to hold the lens and to focus of the monitoring camera. Even though the bayonet mount allows the lens to be changed quickly, the bayonet mount is a deficiency in design for a security camera in that the bayonet mount is exposed and inadvertently contact by repair personnel will cause the monitoring camera to lose its precise focus.

Another deficient feature of the design of the conventional monitoring camera is that all switches are attached behind the body so that the monitoring camera is not easily controlled because of limited access space behind the body when the monitoring camera is attached on the wall. Additionally, all switches are exposed without any covering and easily malfunction as a result of dust or moisture.

The present invention has arisen to mitigate or obviate the disadvantages of the conventional monitoring camera.

SUMMARY OF THE INVENTION

The objective of the present invention is to provide a monitoring camera that can be operated and adjusted easily.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
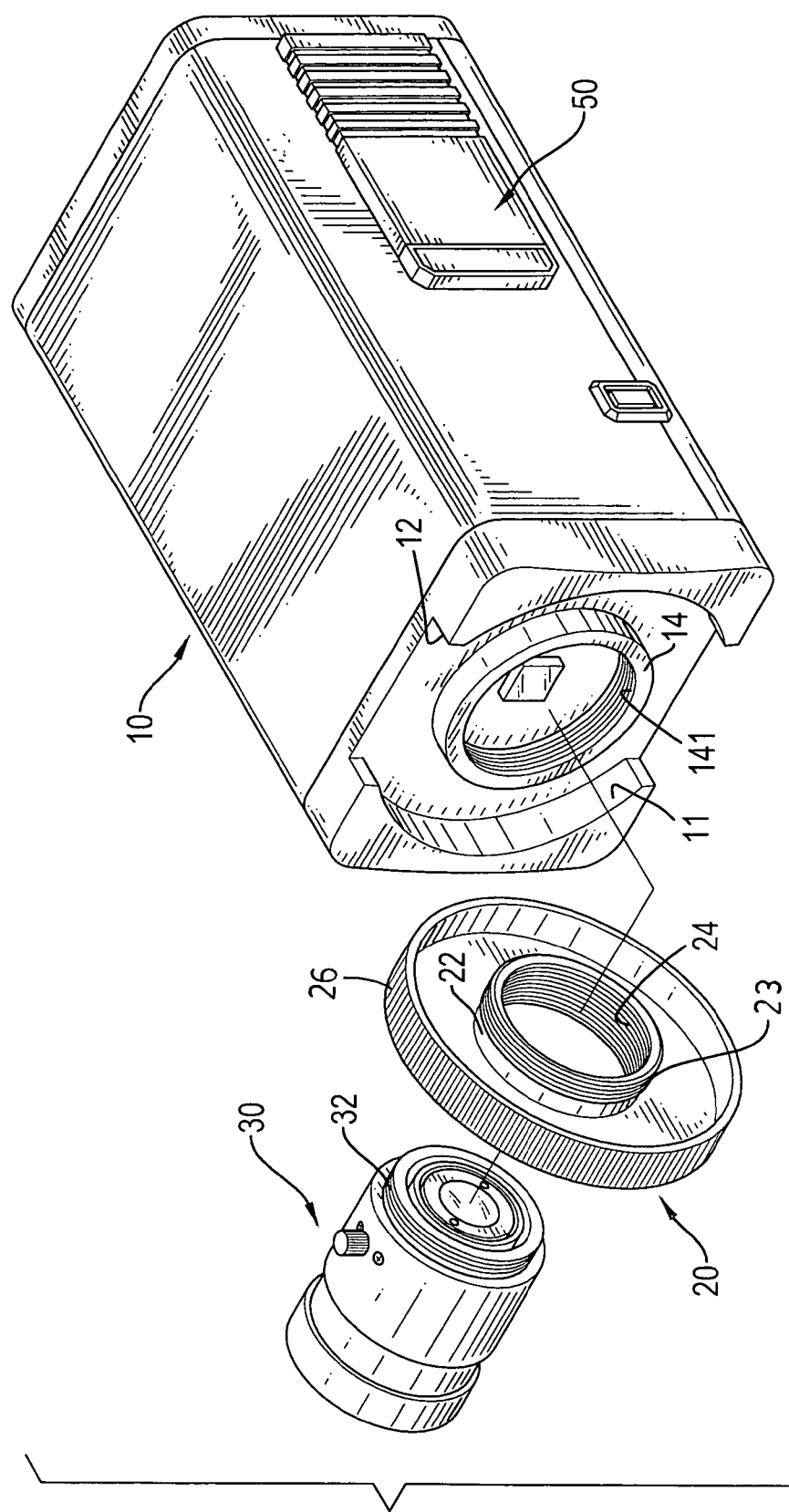
FIG. 1 is an exploded perspective view of a monitoring camera in accordance with the present invention.
Figure 2:
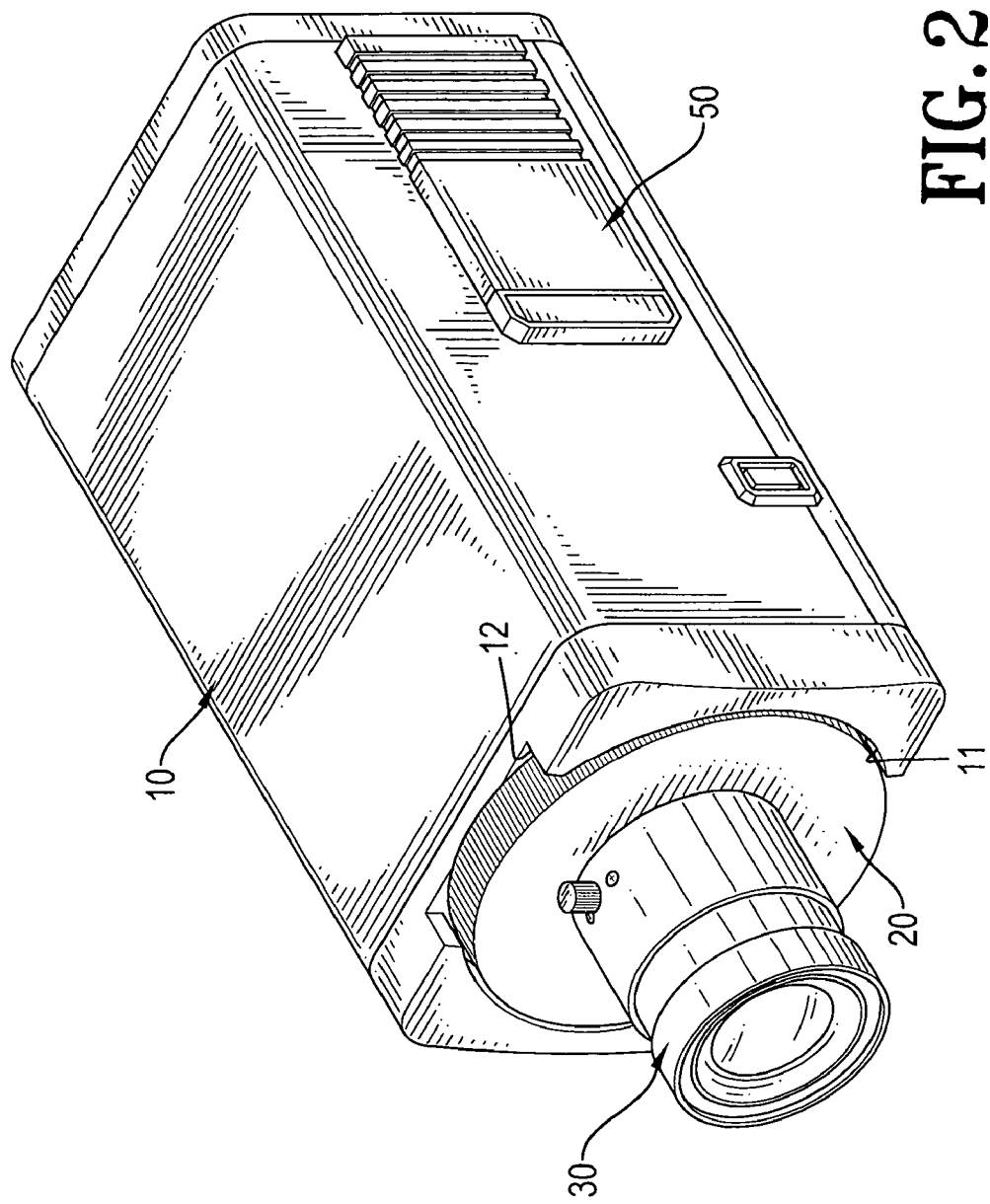
FIG. 2 is a perspective view of the monitoring camera in FIG. 1.

With reference to FIGS. 1 and 2, a monitoring camera in accordance with the present invention comprises a body (10), a focus ring (20), a lens (30) and an optional control cover assembly (50).

The body (10) is a parallelepiped and has a front end (not numbered), a side face (not numbered), a recess (11), a lens mount (14) and multiple control switches (not shown) and multiple sockets. The recess (11) is defined in the front end, has a top edge (not numbered), a bottom edge (not numbered) and two cutouts (12). The cutouts (12) are defined respectively in the top edge and the bottom edge to allow the recess (11) to extend out of the recess (11). The lens mount (14) is formed on the front end inside the recess (11), is an annular protrusion and has an inner threaded surface (141). The multiple control switches and the multiple sockets are mounted on the side face of the body (10).

The focus ring (20) is a disk, is mounted rotatably in the recess (11) and has an outer edge (not numbered), a central hole (not numbered), an inner face (not numbered), an inner flange (22) and an outer flange (26). The inner flange (22) is formed on and protrudes from the inner face around the central hole and has an inner threaded surface (24) and an outer threaded surface (23). The outer threaded surface (23) is screwed into the inner threaded surface (141) of the lens mount (14). The outer flange (26) is formed on and protrudes from the inner face around the outer edge.

The lens (30) has a threaded proximal end (32) that screws into the inner threaded surface (24) of the inner flange (22) on the focus ring (20).

Figure 3:
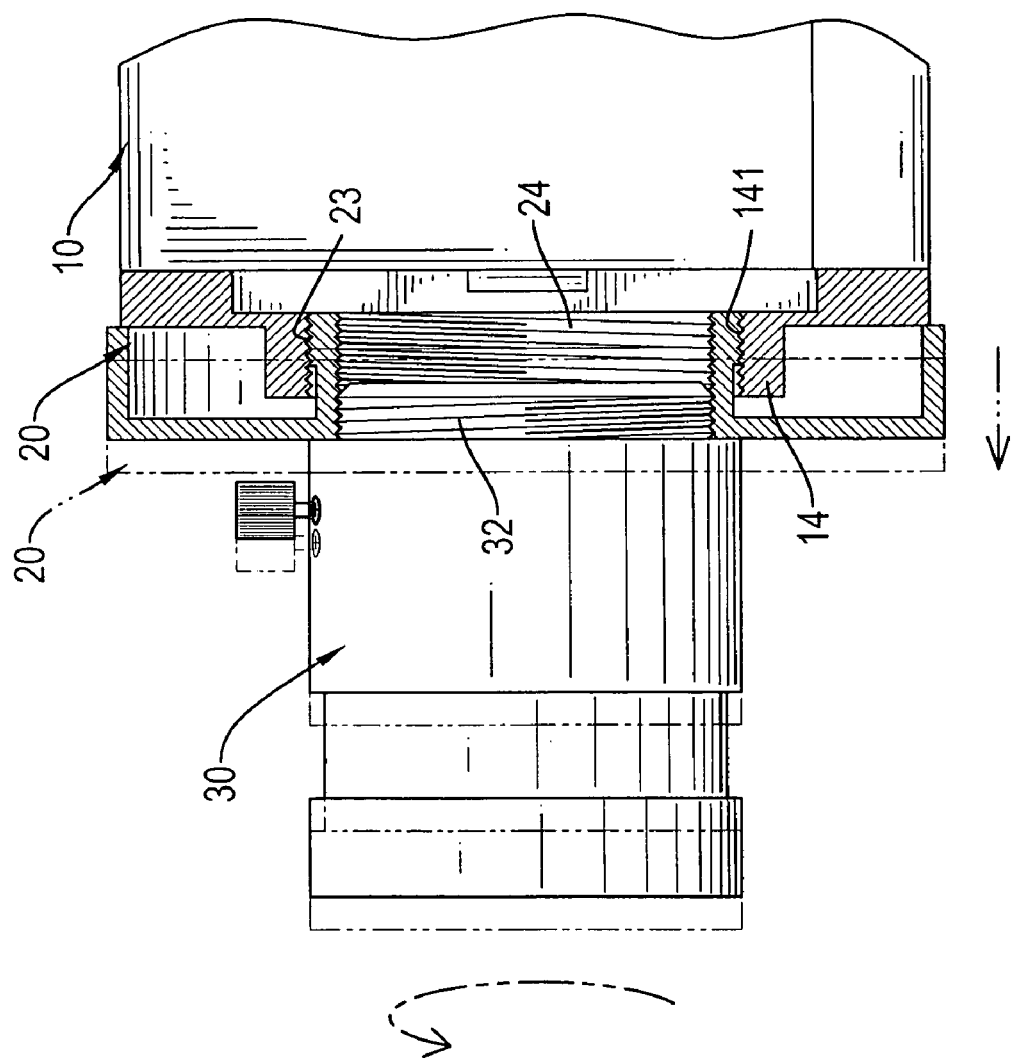
FIG. 3 is an enlarged operational side plane view in partial section of the monitoring camera in FIG. 2.

With further reference to FIG. 3, the focus ring (20) can be moved closer to or farther away from the body (10) to adjust the focus of the lens (30) screwed into the focus ring (20). The focus ring (20) is moved closer to or farther away from the body by pushing the outer flange (26) clockwise or counterclockwise in the cutout (12). If further adjustment is necessary, the lens (30) can be rotated in the inner threaded surface (24) of the inner flange (22) to move the lens (30) farther away from the body. The recess (11) in the body (10) protects the focus ring (20) and keeps the focus ring (20) from being inadvertently rotated so the monitoring camera will not lose its desired focus.

Figure 4:
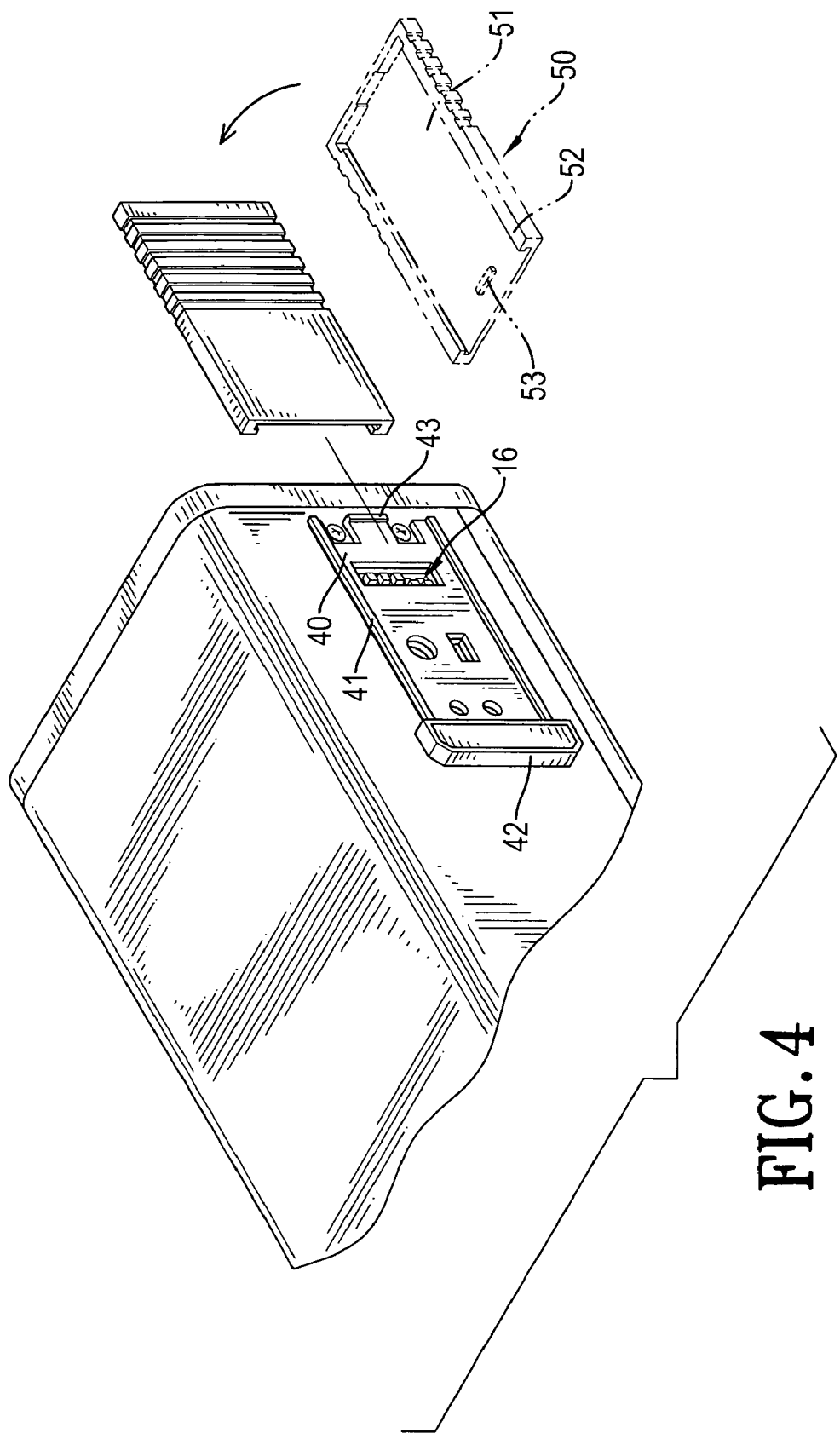
FIG. 4 is an enlarged exploded perspective view of a control cover assembly mounted on the monitoring camera in FIG. 2.

With reference to FIGS. 1 and 4, the control cover assembly (50) protects the multiple switches (16) mounted on the side of the body (10) and has a cover bracket (40) and a cover (51) slidably mounted on the cover bracket (40). The cover bracket (40) being a plate has a front end (not numbered), a rear end (not numbered), two sides (not numbered), two rails (41), a limiting block (42), a latch (43) and multiple openings (not numbered). The limiting block (42) is formed at the front end, and the latch (43) is formed on the rear end. Two rails (41) are formed respectively at the two sides. The multiple openings are defined through the cover bracket (40) and correspond respectively to the multiple switches (16) and sockets to allow access to the switches (16) and the sockets.

The cover (51) being a plate has a front end (not numbered), a rear end (not numbered), two sides (not numbered), two hooked tracks (52) and a transverse rib (53). The two hooked tracks (52) are formed respectively at the two sides of the cover (51) to slidably engage with the two rails (41) to attach the cover (51) to the cover bracket (40). The transverse rib (53) is formed near the front end to abut the latch (43) on the cover bracket (40) and keep the cover (51) from completely disengaging from the cover bracket (40).

Figure 5:
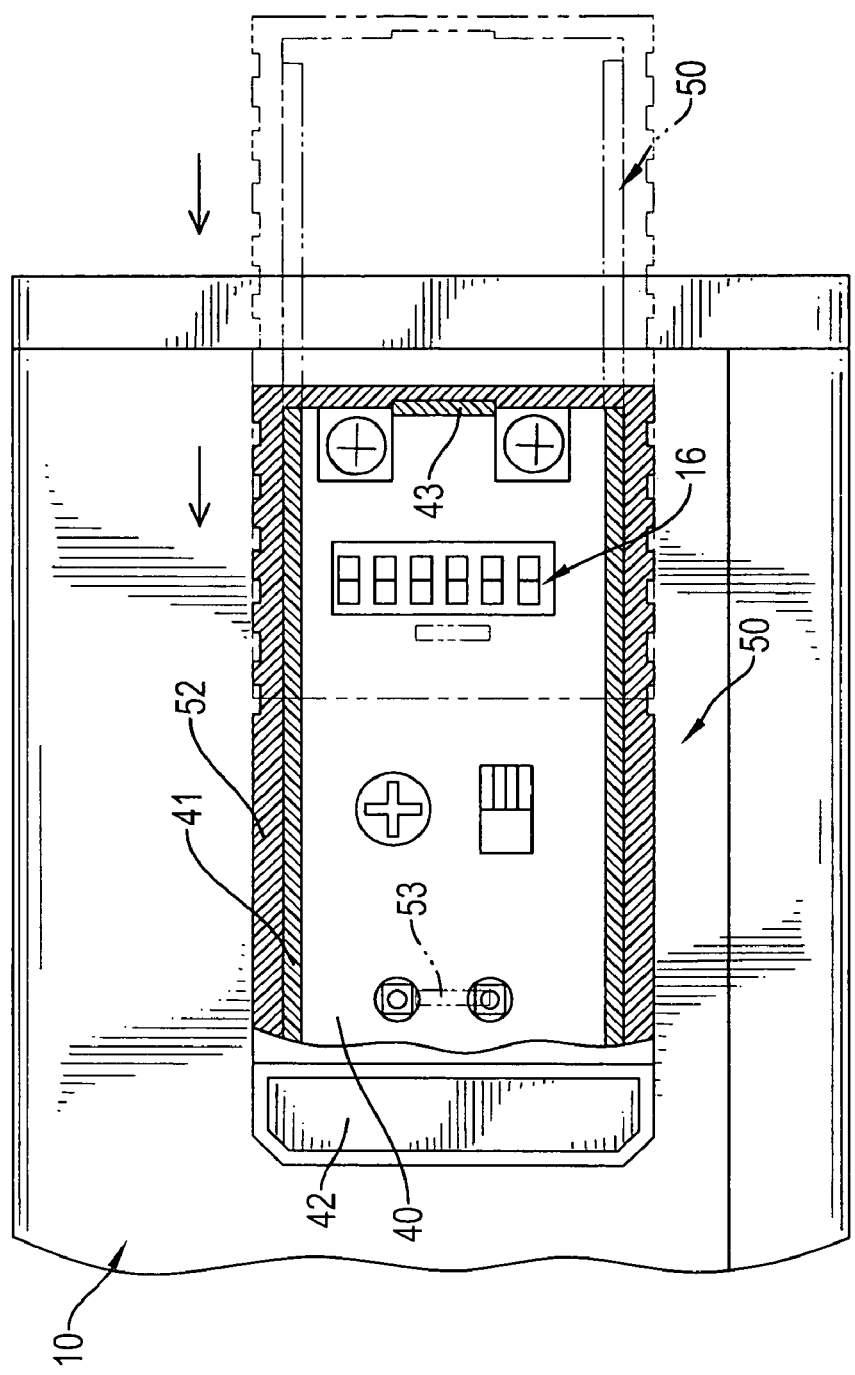
FIG. 5 is an enlarged operational side plane view in partial section of the control cover assembly in FIG. 4.

With reference to FIG. 5, the cover (51) is pushed backward to expose the switches (16) when the switches (16) need to be adjusted. The cover (51) moves backward until the transverse rib (53) abuts the latch (43) on the cover bracket (40). After the switches (16) have been adjusted, the cover (51) is pushed forward to cover the switches (16). The cover (51) moves forward until the front end of the cover (51) abuts the limiting block (42) on the cover bracket (40). Thereby, the switches (16) are protected inside the control cover assembly (50) to prevent malfunctions caused from dust or moisture.

The monitoring camera as described has the following advantages.

1. The lens (50) can be adjusted by rotating the focus ring (20) and the lens (50) itself to allow the lens to have a broader range of focus. Additionally, the lens (50) focus is protected by the recess (11) to keep inadvertent bumping of the monitoring camera from causing the monitoring camera from going out of focus.

2. The switches (16) are attached to the side face of the body (10) to allow better access to the switches (16) so that they can be adjusted easily. Additionally, the control cover assembly (50) provides protection to the switches (16) from the environment to keep the switches (16) from being damaged by dust or moisture.

Although the invention has been explained in relation to its preferred embodiments, many other possible modifications and variations can be made without departing from the spirit and scope of the invention as hereinafter claimed.

What is claimed is:

1. A monitoring camera comprising:
   a body (10) having
     a front end;
     a side face;
     a recess (11) defined in the front end; and
     a lens mount (14) inside the recess (11) and having an inner threaded surface (141);
   a focus ring (20) being a disk, mounted rotatably inside the recess (11) and having
     an outer edge;
     a central hole;
     an inner face;
     an inner flange (22) formed on and protruding from the inner face around the central hole and having an inner threaded surface (24) and an outer threaded surface (23) to screw into the inner threaded surface (141) of the lens mount (14); and
     an outer flange (26) formed on and protruding from the inner face around the outer edge; and
   a lens (30) mounted in the focus ring (20) and having a threaded proximal end (32) screwed into the inner threaded surface (24) of the focus ring (20).

2. The monitoring camera as claimed in claim 1, wherein the recess (11) has a top edge and a bottom edge; and
   two cutouts (12) are defined respectively in the top edge and the bottom edge to allow the recess (11) communicating out of the body (10).

3. The monitoring camera as claimed in claim 1, wherein the body (10) has multiple switches (16) mounted on the side face of the body (10) and a control cover assembly (50) mounted on the multiple switches (16) to protect the switches (16).

4. The monitoring camera as claimed in claim 3, wherein the control cover assembly (50) comprises a cover bracket (40) and a cover (51) slidably mounted on the cover bracket (40).

5. The monitoring camera as claimed in claim 4, wherein the cover bracket (40) being a plate has
   a front end;
   a rear end;
   two sides;
   a limiting block (42) attached to the front end;
   a latch (43) formed on the rear end;
   two rails (41) formed respectively at the two sides; and
   multiple openings to correspond to the multiple switches (16) to access to the multiple switches (16); and
the cover (51) being a plate has
   a front end;
   a rear end;
   two sides;
   a transverse rib (53) formed near the front end to abut the latch (43) on the cover bracket (40); and
   two hooked tracks (52) formed respectively at the two sides to engage the two rails (41) on the cover bracket (40).

* * * * *